United States Patent [19]

Perucchi et al.

[11] 4,417,166

[45] Nov. 22, 1983

[54] STATOR FOR A STEPPING MOTOR

[75] Inventors: Norberto Perucchi, St. Blaise; Elmar Mock, Bienne, both of Switzerland

[73] Assignee: ETA A.G. Ebauches-Fabrik, Solothurn, Switzerland

[21] Appl. No.: 287,829

[22] Filed: Jul. 28, 1981

Related U.S. Application Data

[62] Division of Ser. No. 124,275, Feb. 25, 1980, Pat. No. 4,312,119.

[30] Foreign Application Priority Data

Feb. 27, 1979 [CH] Switzerland ........................ 1931/79

[51] Int. Cl.$^3$ ............................................ H02K 37/00
[52] U.S. Cl. ............................ 310/49 R; 310/40 MM; 310/45; 310/254
[58] Field of Search ................ 310/40 MM, 43, 49 R, 310/45, 162, 163, 194, 254; 368/76

[56] References Cited

U.S. PATENT DOCUMENTS

| | | | |
|---|---|---|---|
| 3,196,297 | 7/1965 | Kaeding | 310/40 MM |
| 4,012,899 | 3/1977 | Matsuura | 310/40 MM |
| 4,141,210 | 2/1979 | Flaig | 310/40 MM |
| 4,205,244 | 5/1980 | Fukushima | 310/40 MM |

FOREIGN PATENT DOCUMENTS

| | | |
|---|---|---|
| 1155851 | 10/1963 | Fed. Rep. of Germany ........ 310/40 MM |
| 2559635 | 4/1977 | Fed. Rep. of Germany ........ 310/49 |

*Primary Examiner*—R. Skudy
*Attorney, Agent, or Firm*—Parkhurst & Oliff

[57] ABSTRACT

A stator for a stepping motor comprises a cylindrical coil of compact size formed by winding wire directly on the center portion of a core. This center portion is coated with a film formed of a hard, compact insulating material adhering strongly to the core. An electrophoresis operation is used to obtain a film of minimum thickness in an efficient manner. The core includes end lugs which are bare on one face so that metallic contact can be established with the pole pieces of the stator. Prior to electrophoresis, the faces of the lugs intended to be bare are covered with a mask of synthetic material, preferably deposited while dissolved in a suitable solvent.

6 Claims, 4 Drawing Figures

STATOR FOR A STEPPING MOTOR

This is a division of application Ser. No. 124,275 filed Feb. 25, 1980, now U.S. Pat. No. 4,312,119.

This invention relates to a method of manufacturing stators for stepping motors of electronic watches and to a motor incorporating a stator produced by this method.

German Published Application (DAS) No. 25 59635 discloses a stepping motor suitable for use in a watch and incorporating a stator having a coil mounted on an elongated core, the ends of which are connected to pole pieces. These pole pieces encircle the rotor and are shaped in such a way as to conduct and direct the magnetic flux resulting from the current pulses so that the action of the stator flux upon that of the rotor causes the latter to rotate. Moreover, the pole pieces are intended to block the rotor in a stable orientation between the pulses.

Stepping motors for electronic watches, and particularly for wrist watches, are constantly being improved in order to increase their reliability, decreases their size, reduce their cost-price, or better their efficiency. The power which the motor must supply to the pinion of its rotor is determined by the arrangement of the gear-train and the display elements. The efficiency depends upon the design of the motor and the materials used. The size of the stator coil, which forms the largest element of this type of motor, depends upon the power output, the efficiency, and the arrangement of the winding. Between the surface of the core and the first turns of the winding, it is necessary to provide an intermediate layer of insulating material which protects the insulation of these first turns. Now, if the cross-section of the core is on the order of $0.6 \times 0.6$ mm., for example, an intermediate layer 0.1 mm. thick would increase the length of wire necessary for forming the first layer of turns by 25%.

For manufacturing reasons, the cores preferably consist of elements blanked from a strip of metal; and from the point of view of economy of operations, it is advantageous to carry out the blanking in one step, without correction. However, such an operation tends to leave sharp edges just in the areas which support the winding, and this has hitherto complicated the developing of a manufacturing method that simultaneously ensures optimum reliability, simplification to allow mass-production, and compact size.

Thus, in the design described above, the intermediate layer supporting the winding constitutes a coil form produced by spraying plastic material onto the core.

It is an object of the present invention to provide an improved method of manufacturing stators by means of which the size of the coils used in stepping motors for watches may be reduced, while at the same time ensuring the reliability of the motors and without increasing production costs.

In the manufacture of industrial motors comprising magnetic cores formed of laminated core plates, blanked with slots or projecting poles, it has been proposed (cf. French Pat. No. 2,084,521) to coat the inner surfaces of the slots or the outer surfaces of the projecting poles with a layer of plastic material formed by electrostatic deposit, followed by heating. A thick, smooth coating which protects the insulation of the conductors is thus formed on the sharp edges of the blanked plates.

The formation of thin coatings of paint on metal strips by electrophoresis has also been disclosed (cf. U.S. Pat. No. 3,813,327), by means of which method coatings on the order of 10 microns thick could be formed on continuous strips. However, there is nothing to suggest that this process could contribute the desired improvement in the manufacture of stepping motors intended for watches, particularly for wrist watches.

To the end indicated above, therefore, in the method according to the present invention, the improvement comprises the steps of partially blanking, from a strip of ferromagnetic metal, cores including an elongated center portion and widened end portions, placing a mask on the marginal zones of one face of the strip in order to cover the widened portions of the cores, forming a thin, adherent film of resin on the non-masked portions of the strip by electrophoresis, removing the mask, completing the blanking operation, and forming coils by winding insulated wire over the insulating films along the center portions of the cores.

According to another aspect of this invention, there is provided a stepping motor for electronic watches, of the type having a stator including an elongated coil, a core of ferromagnetic metal made in one piece with widened end portions and a center portion of rectangular cross-section passing axially through the coil, and two pole pieces connected magnetically to the widened portions of the core by overlapping and surface contact, wherein the improvement comprises a film of resin, on the order of 10 microns thick, covering the center portion of the core and one face of the widened core portions, the turns of the coil resting directly upon this film.

A preferred embodiment of the motor according to the invention and of the method of manufacture used will now be described in detail with reference to the accompanying drawings, in which.

Figure 1:
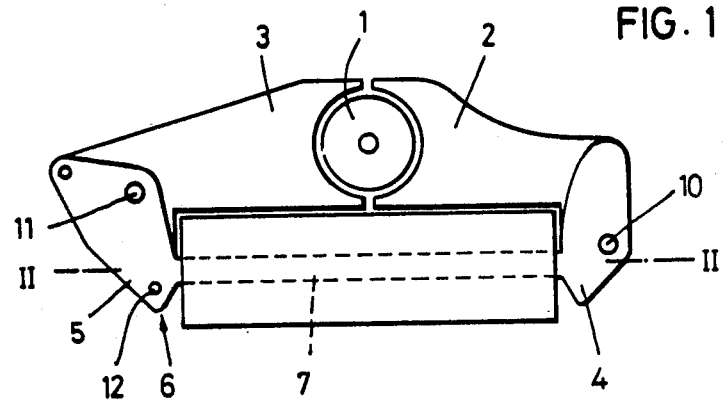
FIG. 1 is a top plan view of the motor.
Figure 2:
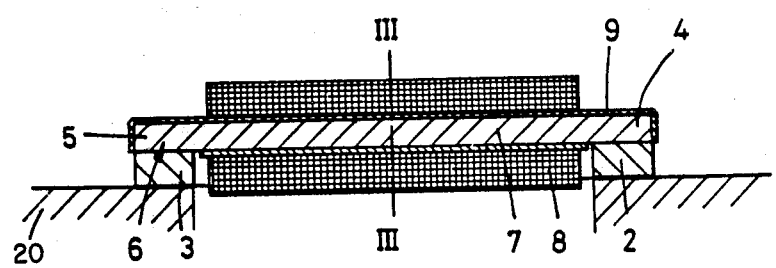
FIG. 2 is a section taken on the line II—II of FIG. 1.

The motor shown in FIGS. 1 and 2 is of a type commonly used in quartz wrist watches having stepping motors. A rotor 1, composed of a cross-magnetized cylindrical magnet and of a shaft passing completely through the magnet, is supported by two bearings integral with the frame of the watch movement and rotates between opposite concave faces of two pole pieces 2 and 3 blanked from plates of ferromagnetic material of appropriate size. The rotor shaft bears at one end a pinion which drives a speed-reduction gear-train actuating the hands of the watch. The ends of pole pieces 2 and 3 are magnetically connected to two lugs or end portions 4 and 5 constituting the ends of a core 6, the center portion 7 of which is in the shape of a straight bar of rectangular cross-section. Center portion 7 is situated within a coil 8 made up of numerous turns of very fine insulated copper wire. Current pulses run through coil 8, which supplies to the magnetic circuit at each pulse the rotation energy of the motor. It is known that the very short current pulses which pass through coil 8 and impart to rotor 1 a rotation of a predetermined angle may reach an intensity close to one milliampere. These current pulses create in the magnetic circuit 7, 4, 2, 3, 5 instantaneous magnetic fluxes whose interaction with the flux of rotor 1 creates the torque which drives the gear-train. It is therefore essential that the magnetic flux be as intense as possible—in other words, that the magnetic losses be as small as possible.

Figure 3:
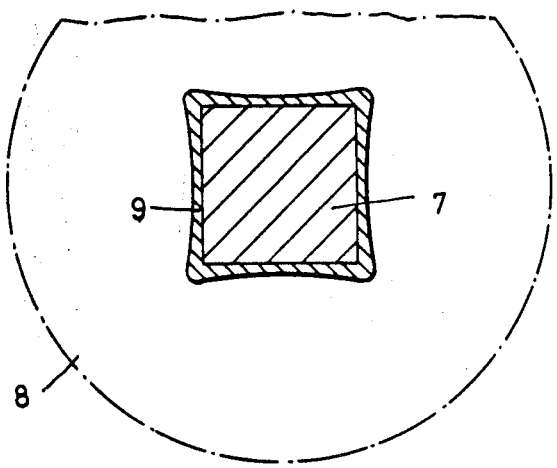
FIG. 3 is a section on a larger scale taken on the line III—III of FIG. 2.

As may be seen in FIG. 3, central portion 7 of core 6 is coated on all four faces with a film 9. This film, on the order of 10 microns thick, is composed of a resin-type product which, once deposited, has the properties of being strongly adherent to the metal of core 6, insulating, compact, and hard, so as to constitute a good support for the turns of copper wire forming coil 8.

The motor described presents the particularity visible in FIG. 2, where it will seen that core 6 is completely covered by film 9 except on the lower faces of lugs 4 and 5. These faces are, in fact, bare and in direct contact with the metal of the ends of pole pieces 2 and 3. Lug 4 includes a hole 10 by means of which pole piece 2 can be fixed both to a motor support 20 and to lug 4, whereas lug 5 has not only a hole 11 serving the same purpose but also two centering holes 12. The parts making up the stator may also be fixed on the rigid support 20 forming part of the watch movement. The magnetic flux passes by direct metallic contact from core 6 via lugs 4 and 5 into pole pieces 2 and 3, so that the magnetic resistance of the circuit is minimal.

If core 6 were completely covered by a thin film such as film 9, this film would constitute a barrier between the pole pieces and lugs 4 and 5. Hence it is necessary to use a method which, by efficient means allowing mass-production, makes it possible to cover cores such as core 6 with a thin film no more than 10 microns thick, but keeping this film from covering the faces of the lugs intended to come in contact with the pole pieces. It has been found possible to form a hard, adherent insulating film 10 microns thick on the cores by an electrophoresis treatment. This treatment presents a number of advantages. It is very efficient to operate because the deposit of ions can be caused to cease automatically when the desired thickness of 10 microns is reached. Moreover, the four longitudinal edges of the core attract an increased concentration of the ions deposited during the treatment, thus creating a slightly greater thickness there, as illustrated in an exaggerated manner in FIG. 3. This effect is very favorable for preserving the insulating film deposited directly on the core. The edges of center portions 7 of cores 6 produced by blanking from a strip cannot damage the copper wire. However, electrophoresis treatment causes the film to be deposited on all surfaces of the parts placed in the bath, and it would not be very efficient to strip the faces of lugs 4 and 5 by a subsequent operation. Such an operation would be long, delicate, and liable to damage the metal of the core.

An explanation will now be given of the method by which a core such as core 6, covered by a film 9 no thicker than the films deposited by electrophoresis, can be efficiently produced without having the faces of the lugs intended to come in contact with the pole pieces covered by this film.

Figure 4:
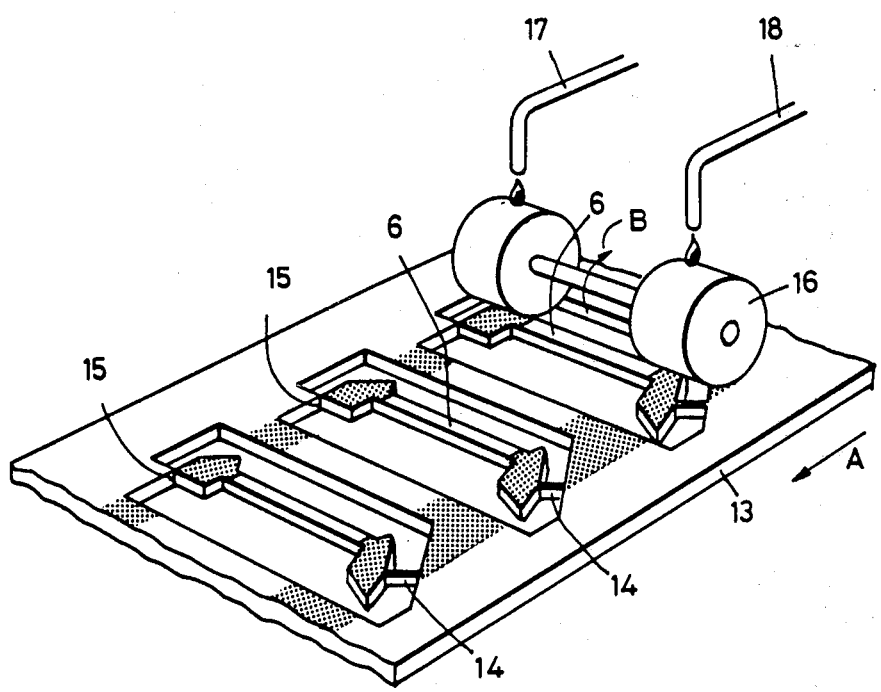
FIG. 4 is a diagrammatic perspective view illustrating one step in the method of manufacturing the stator of the motor.

This method is illustrated in FIG. 4, which shows a strip of material 13 from which blanks of cores 6 have been partially cut, leaving them attached to the rest of the strip by narrow bridges 14 and 15. The blanking operation is carried out prior to treatment of the strip. After a heat treatment, the strip therefore exhibits the metallic and magnetic characteristics required for the functions of a core. However, the result of this treatment is to make the metal very soft, which precludes any further treatment for partial removal of an adherent film by mechanical means. As shown in FIG. 4, strip 13 is subjected to a calendering operation during which a rotating pad 16, illustrated schematically, is brought into contact with the zones forming the lugs of cores 6. As strip 13 moves in the direction indicated by arrow A, pad 16 is rotated in the direction indicated by arrow B. Through tubes 17 and 18, a liquid comprising a plastic material dissolved in a solvent, e.g., polystyrene dissolved in perchloroethylene, is constantly dripped on the ends of pad 16. Thus, a coating of this solution is deposited on one of the faces of lugs 4 and 5 and on corresponding areas of the rest of the strip. By evaporation of the perchloroethylene, the coat of polystyrene thus formed is fixed to the metal of the lugs and adheres strongly thereto.

This operation can be carried out quickly and efficiently on rows of core blanks held to strip 13 by bridges 14 and 15.

Next, strip 13 is subjected to the electrophoresis operation known per se. During this operation, all bare surfaces of the core blanks are covered by film 9 to an even thickness on the order of 10 microns, as stated previously, but with reinforcements along the longitudinal edges.

The third operation to be carried out consists in removing the masks formed by the coats of polystyrene covering one face of each of the lugs. This is easily accomplished by means of the same solvent used during the calendering operation. Strips 13 are thus dipped in a perchloroethylene bath to remove the masks. The resulting cores 6, while covered with a hard, thin, adherent film capable of supporting the coil winding, include lugs each having one bare face which can consequently enter into metallic contact with the associated pole piece.

This design is dually advantageous: for one thing, owing to the thinness of film 9, as much as possible of the space occupied by coil 8 is taken up by copper, so that maximum magnetic flux can be created in a minimum total volume; and for another thing, since there is metallic contact between the lugs of the core and the pole pieces, the magnetic flux created in the core during the passage of the current pulses is transmitted to the pole pieces with greater efficiency. Thus, the current pulse is utilized to the maximum for producing torque on the rotor.

It will be obvious that the masks formed by a plastic material dissolved in a suitable solvent might equally well be deposited by means other than the calendering operation illustrated in FIG. 4. For example, the deposit might take place by spraying, with strip 13 being protected by templates, or the masks might be applied by brushes.

What is claimed is:

1. A stepping motor for an electronic watch having a stator comprising a one-piece core of ferromagnetic metal including widened end portions having opposed faces and a center portion of rectangular cross-section coupled between said widened end portions, an elongated coil formed about said center portion such that said center portion passes axially through said coil, and two pole pieces coupled magnetically to said widened end portions by overlapping surface contact, wherein the improvement comprises:

a film of resin covering said center portion and one face of each of said widened end portions and forming reinforced zones of resin along edges of said core of rectangular cross-section, said coil being formed about said center portion such that turns of said coil rest directly upon said film.

2. The motor of claim 1, wherein the thickness of said film is on the order of 10 microns.

3. The motor of claim 1, wherein said core is secured to a rigid support and said pole pieces are mounted such that each of said pole pieces contacts the other of said opposed faces of said widened end portions to create a magnetic flux path between said core and said pole pieces.

4. A stepping motor secured to a rigid support of an electronic watch and having a stator comprising a one-piece core of ferromagnetic metal including widened end portions having opposed faces and a center portion of rectangular cross-section coupled between said widened end portions, an elongated coil surrounding said center portion such that said center portion passes axially through said coil, and two pole pieces coupled magnetically to said widened end portions by overlapping surface contact, wherein the improvement comprises:
a thin film of resin covering said center portion and one of said opposed faces of each of said widened end portions and including reinforced zones of resin of increased thickness formed on edges of said center portion, said coil being formed about said center portion such that turns of said coil rest directly upon said film, each of said pole pieces having an end portion which is maintained in overlapping engagement with the other of said opposed faces of one of said widened end portions and secured to said support.

5. The motor of claim 4 wherein the thickness of the film on said core, other than the reinforced zones, is on the order of 10 microns.

6. The motor of claim 4 wherein said overlapping end portions of each pole piece with one of said widened end portions forms the magnetic path between said core and said pole pieces for the magnetic flux created by said coil.

* * * * *